UNITED STATES PATENT OFFICE.

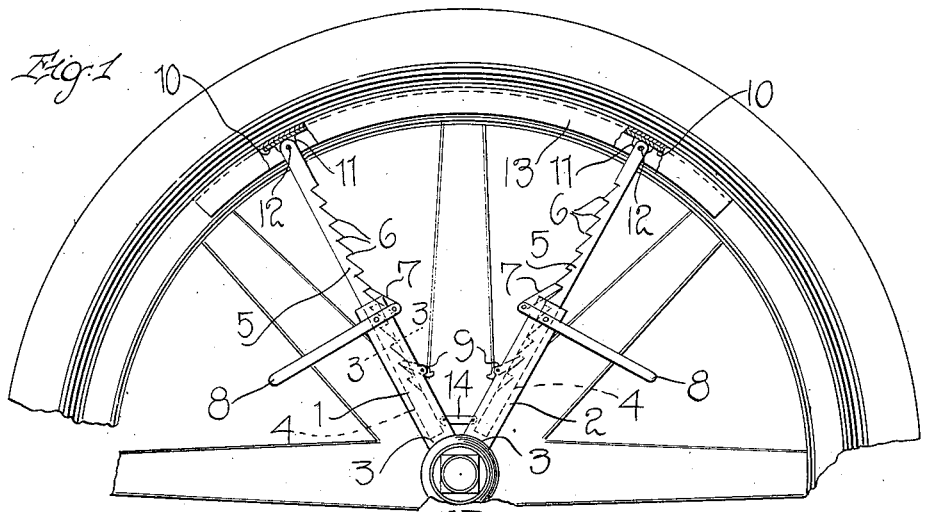
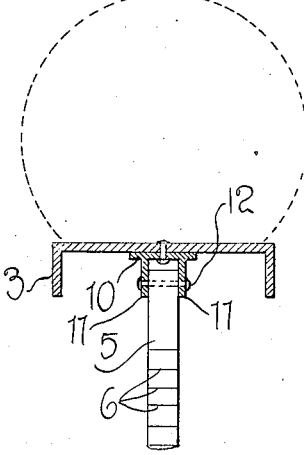
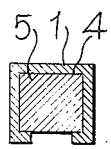
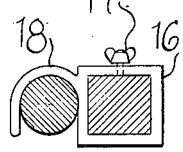
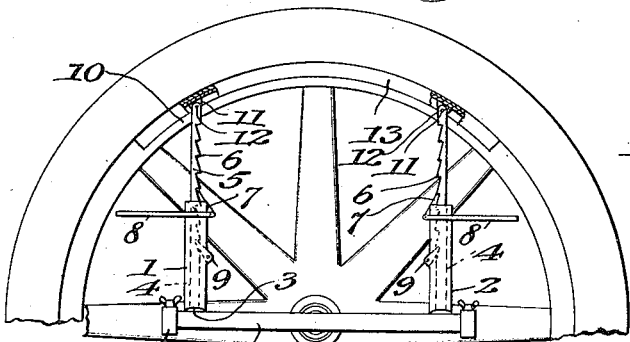

HARMON E. HART, OF LAURENS, IOWA.

TIRE-SETTING DEVICE.

1,129,487.   Specification of Letters Patent.   Patented Feb. 23, 1915.

Application filed March 25, 1914. Serial No. 827,185.

*To all whom it may concern:*

Be it known that I, HARMON E. HART, a citizen of the United States, residing at Laurens, in the county of Pocahontas and State of Iowa, have invented certain new and useful Improvements in Tire-Setting Devices, of which the following is a specification, reference being had to the accompanying drawings.

This invention relates to new and useful improvements in tire setting tools and more particularly to a device for setting or placing pneumatic tires in position upon automobile wheels, the main object of the invention being the provision of a tire setting device of this character whereby heavy pneumatic tires may be quickly and readily placed upon automobile wheel rims.

Another object of the present invention is the provision of a tire setting tool of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a tire setting device constructed in accordance with my invention, illustrating the application of the same. Fig. 2 is a transverse sectional view of the guide plate. Fig. 3 is a transverse sectional view taken on the line 3—3, Fig. 1. Fig. 4 is a side elevation of the supporting bar used for supporting the tire device when the hub of the wheel is not sufficiently large; and Fig. 5 is a transverse sectional view taken on the line 5—5, Fig. 4.

In carrying out my invention, I provide two divergently disposed casings, generally indicated in the accompanying drawings by the numerals 1 and 2. The inner ends of these casings are substantially arcuate in form, as shown at 3, so that the same may readily rest upon the hub of the wheel, when placed in position. The casings 1 and 2 are provided with the central substantially rectangular openings 4, in which are slidably mounted the racks 5, said racks being provided upon one face thereof with a plurality of teeth 6, adapted to be engaged by means of a pivoted pawl 7, whereby to raise said racks within the casing. The pawls 7 are actuated by means of the pivoted levers 8, said levers being pivotally mounted upon the casings 1 and 2, adjacent the outer ends thereof, whereby upon the pivotal movement of said levers, the pawls 7 will be actuated to engage the teeth 6 and raise the racks 5 within the casings. The racks 5 are retained in adjusted position by means of the pivoted pawls 9 which are mounted upon the opposed faces of the casings and are adapted to engage the teeth 6, said pawls being located upon the casings at a point adjacent the center thereof.

Pivotally mounted upon the outer ends of the racks 5, are the plates 10 which are provided with the spaced ears 11 adapted to be arranged upon opposite sides of the outer ends of the racks 5 and removably connected thereto by means of the transverse bolts 12. Mounted upon the plates 10 and rigidly secured thereto, is the U-shaped guide plate 13 which is preferably arcuate in form to conform to the curvature of the rim of the wheel, so that in placing the tire in position upon the wheel, it may be readily slid from the guide into the groove in the rim.

From the above description, taken in connection with the accompanying drawings, the construction of my improved tire setting tool will be apparent as follows:—When it is desired to place pneumatic tires upon wheel rims, the arcuate portions 3 of the casings 2, are arranged upon the upper face of the hub of the wheel and are securely retained against lateral movement by means of the link member 14, which connects the inner ends of the casings. The tire is then engaged over the wheel at the lower side thereof and the upper portion of the tire is arranged upon the guide plate 13, it being understood that the racks 5 are in their lowered positions. The levers 8 are then actuated to move the racks 5 outwardly, forcing the upper portion of the tire outwardly until it may be readily forced from the guide plate on to the wheel rim. It will be noted that the guide plate 13 is provided with down-turned flanges upon each of the edges thereof, whereby to strengthen the plate and prevent the same from becoming easily bent or distorted. From this it will be apparent that by the use of my improved tire setting tool, a pneumatic tire may be quickly and readily placed upon the grooved rim of an automobile rim.

In Fig. 4, I have illustrated a slightly modified form of the invention, wherein I provide a supporting bar which is adapted to be used in connection with my improved tire setter when the hub of the wheel is not sufficiently large to support the inner ends of the casings 1 and 2. The supporting bar which is indicated by the numeral 15 is rectangular in cross section and is provided at each end thereof with the sleeve 16 held in position by means of the set screws 17. Formed integral with one side of each of the sleeves 16, is an arcuate hook member 18 adapted to be engaged with the spokes of the wheel, as illustrated, so that the bar 15 will be arranged in a horizontal position to support the lower ends of the casings 1 and 2 which are shown in Fig. 4 as disposed in a vertical position. Thus, when the hub of the wheel will not support the casings 1 and 2, the bar 15 is supported upon transversely alined spokes and the casings 1 and 2 are disposed in a vertical position and supported upon said bar. From this it will be apparent that should the wheel of a vehicle be such that the same is not provided with a hub portion sufficiently extended to support the casings 1 and 2, the bar 15 may be readily placed in position to support the same.

It will be apparent from the above that I have provided a simple and durable device whereby pneumatic tires may be quickly and readily placed upon vehicle wheels of various types. It will also be apparent that the device is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claims.

Having thus described this invention, what I claim is:

1. A tire setting device comprising an arcuate member, racks pivotally engaged with the member adjacent the extremities thereof, a casing for each of the racks and with which said rack is telescopically engaged, a lever pivoted intermediate its length to the casing adjacent the inner end thereof, a pawl pivotally engaged with the lever and coacting with the rack, and a pawl pivotally supported by the casing and coacting with the rack for holding the rack against retrograde movement.

2. A tire setting device comprising an arcuate member, racks pivotally engaged with the member adjacent the extremities thereof, a casing for each of the racks and with which said rack is telescopically engaged, a lever pivoted intermediate its length to the casing adjacent the inner end thereof, a pawl pivotally engaged with the lever and coacting with the rack, a pawl pivotally supported by the casing and coacting with the rack for holding the rack against retrograde movement, and a link connection between the outer extremities of the casings for holding said casings against separation.

In testimony whereof I hereunto affix my signature in the presence of two witnesses.

HARMON E. HART.

Witnesses:
C. A. CARLSON,
MILO I. JOHNSON.